July 24, 1928.
A. BAISH
MOLD
Filed May 13, 1925
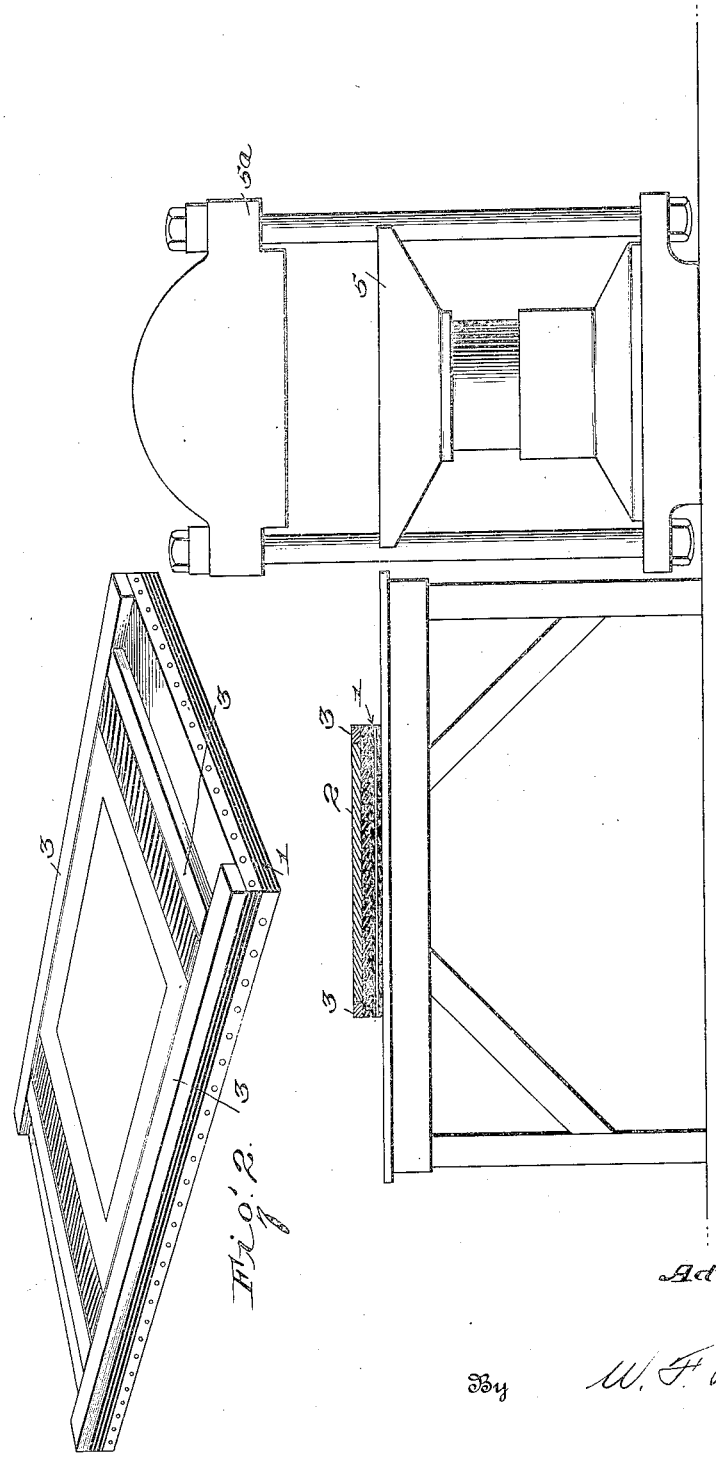
Inventor
Adrian Baish
By W. F. Buckley
Attorney Patented July 24, 1928.

1,677,881

UNITED STATES PATENT OFFICE.

ADRIAN BAISH, OF WADSWORTH, OHIO.

MOLD.

Application filed May 13, 1925. Serial No. 30,095.

This invention relates in general to molds and more particularly to an improved rubber composition mold, the present invention consisting in the novel mold structure and composition as well as in the novel process for producing the mold.

One of the principal objects of the present invention resides in the provision of a process and mold of the character specified whereby a composition rubber mold may be produced in an easy and practical manner with comparatively slight expense and of such a character as to enable the production of various and sundry articles such as floor coverings, imitation leather, as well as other diverse articles from rubber compositions; all molded goods, such articles as toys, balls, heels, belts, small solid tires for baby buggies, trucks, coaster wagons, etc., in such a way that the imitation or composition articles have the features of pattern, ornamentation, external structure of similar articles of textile or leather, while being much less expensive to produce and of greater strength and durability.

A further object of the invention resides in the provision of a composition rubber mold which maintains its shape and form under severe and prolonged use and which may be readily reconditioned at a comparatively slight expense, and very light to handle.

Other objects and advantages reside in certain novel features which will be hereinafter more fully described.

In the drawing accompanying the application:

Figure 1 is a view illustrating the manner of producing the mold; and Figure 2 is a view showing the mold structure.

In producing the mold constituting the present invention a mold backing or apron designated at 1 is first prepared. In preparing this apron or backing the ordinary rubber mill or mixing machine used in the manufacture of rubber is employed.

The composition of the apron for backing is as follows:

| | Parts. |
|---|---|
| Smoked sheet | 10 |
| Crushed and disintegrated beads of old tires (fabric) | 50 |
| Sulphur | 14 |
| Zinc oxide | 3 |
| Magnesium oxide | 2 |
| Dixie clay | 17 |
| Black substance (oils and sulphur) | 2½ |
| An accelerator comprising a zinc salt of dimethyldithiocarbamic acid and a small amount of methyl mustard oil | ½ |
| Lime | 10 |

In place of the smoked sheet caoutchouc or a mixture of the latter with palm oil may be employed; fifteen parts of caoutchouc and five parts of palm oil being employed.

The beads are first crushed on the rolls of the rubber mill, then the smoked sheet or caoutchouc is broken down on the mill 20 minutes and afterwards the other ingredients are thoroughly incorporated in the mix. After the ingredients have been completely and thoroughly incorporated, a layer of cord fabric is placed on the sheet of composition thus formed and the sheet and cords are run through the mill one way with the mill opened and each time the mill rolls are brought closer together in order to work the cords into the sheet until they are embedded in the sheet about half way from its opposite faces.

This green stock is then placed on a stand just as it is taken from the mill, and left there until one wishes to use it. When the mold is to be prepared two sections or pieces of stock are taken from the stand and are laid one on the other with the cords of one at right angles to the cords of the other, the same as crossing the grains.

On the backing thus constituted a previously prepared mold facing is placed. The mold facing is of hard sponge rubber plastic when first placed on the back but fixed and hardened and united and vulcanized to the back or apron stock, and at the same time receiving the impression of the original. The mold facing may be of any one of the following compositions:

It is upon the mold facing that the original design is placed just before the apron and mold facing are placed in the press. Both mold facing and original must be dusted with wheat flour before being placed together.

One.

| | Parts. |
|---|---|
| Smoked sheets | 285 |
| Sulphur | 105 |
| Tripoli | 90 |
| Lithopone | 150 to 250 |
| Magnesium carbonate | 40 |
| Cerecine wax | 20 |
| Powdered mica | 40 |
| Asbestine | 40 |
| Lime | 40 |
| An accelerator comprising a zinc salt of dimethyldithiocarbamic acid and a small amount of methyl mustard oil | 2 |

Two.

| | Parts. |
|---|---|
| Smoked sheets | 285 |
| Sulphur | 105 |
| Tripoli | 90 |
| Lithopone | 150 to 250 |
| Candelilla wax | 20 |
| Asbestine | 20 |
| Powdered mica | 20 |
| Magnesium carbonate | 40 |
| Lime | 20 |
| Sulphate of zinc | 40 |
| Accelerator (as in one) | 2 |

Three.

| | Parts. |
|---|---|
| Oil steamed shoddy | 200 |
| Cotton lints | 100 |
| Zinc oxide | 100 |
| Lime | 50 |
| Powdered coke | 200 |
| Powdered mica | 100 |
| Dixie clay | 100 |
| Murcurious nitrate | 1 |
| Sulphur | 100 |
| Carbon black | 20 |
| Accelerator (as in one) | 1 |
| An accelerator comprising an ethylidene mixture of $(C_6H_5NH)_2..CH.CH_3$ $(C_6H_5N..CH_3)$ | 2 |

(This accelerator is hereinafter referred to as accelerator No. 2.)

Four.

| | Parts. |
|---|---|
| Smoked sheets | 185 |
| Sulphur | 105 |
| Whiting | 90 |
| Zinc oxide | 50 |
| Lithopone | 120 |
| Cerecine wax | 30 |
| Asbestos pulp | 40 |
| Asbestine | 20 |
| Powdered mica | 60 |
| Magnesium carbonate | 20 |
| Accelerator (as in one) | 1 |

Five.

| | Parts. |
|---|---|
| Smoked sheets | 10 |
| Oil steamed shoddy | 50 |
| Sulphur | 14 |
| M. R. X (mineral rubber) | 1 |
| Zince oxide | 3 |
| Magnesium oxide | 2 |
| Dixie clay | 17 |
| Black substance | 2½ |
| Accelerator No. 2 | ½ |
| Lime | 10 |

The ingredients of the composition to be used and which may be any of the five just described are thoroughly incorporated in the mill and worked into a sheet-like form. Afterwards the mix is calendered into liner rolls to be stored for future use. The section to be used as mold facing is severed from the roll and applied to and placed on the top layer of the backing as shown in drawings. In the drawings the facing is indicated at 2. The backing is larger than the facing and around the facing a frame is placed. The frame shown consists simply of a number of metallic bars which rest on the backing and engage the edges of the facing. The metallic bars are designated at 3. The backing, facing and bars are then placed on the head 5 of a press and the original which may be a rug or any other article which the mold is to reproduce is placed on the facing. The facing is dusted evenly with flour, also the original before placing the original thereon. Then after the original is placed on the mold a heavy cotton cloth is placed over the top of the stock to hold the heat. The press is operated to cause its heads 5 and 5ª to come together with the assembled mold parts, original and cloth between them and steam is supplied to the hollow heads of the press so as to subject the mold facing and backing to the action of heat and pressure which causes the original to impress the mold facing and which cures or vulcanizes the backing and facing so that the backing and facing are welded or united or vulcanized or adhesion takes place permanently and the mold is fixed and hardened and at the same time having received the impression. Of course, it is understood that the heat treatment on the press is the first to which the backing or facing is subjected, the rolls of the mill being kept cool during the preparation of breaking down and mixing the stock on the mill.

The backing with its two series of angularly exposed cords is inextensible and will not spread in the press. The facing is held against spreading by the action of the bars 3 while in the press and after the facing and backing are permanently united and vulcanized, the facing is hardened and fixed and is strengthened by the inextensible backing.

In using the mold with the compositions which make up the articles to be produced, the face of the mold is dusted with wheat flour or with refined corn meal flour, also article is dusted, to facilitate stripping of the articles from the mold. The articles to be produced are made of a composition including rubber and must be stripped immediately after removal from the vulcanizing press in which they are placed with the mold. Many varied and diverse articles may be produced in this way.

If the mold facing is of the composition specified under the heading "One", the mold facing and backing and the original are kept in the press for a period ranging from sixty to seventy minutes while steam pressure amounting to seventy pounds is supplied to the hollow head of the press. The composition defined under heading "Two" requires the same cure. The composition defined under heading "Three" must be kept in the press for forty-five minutes with a steam pressure of eighty pounds, the composition defined under heading "Four" for sixty minutes with forty pounds steam pressure; and the composition defined under heading "Five" for fifteen minutes with eighty pounds steam pressure.

The usual form of the mold is flat, but it may be shaped as desired, and may be made of cylindrical form to provide rollers adapted for use in various arts, an example of which use is the ornamenting, figuring, or embossing of imitation leather.

The mold produced by the invention is comparatively inexpensive to manufacture, may be impressed from practically any original, permits the articles which it shapes and forms to be readily stripped therefrom and stands up under prolonged and severe uses. The mold can be used for as many cures as the person desires.

There must be metallic bars used about the mold each cure in order to hold the stock from running out over the mold. The stock mentioned is that which is being cured into the same design as the mold or original design.

I claim:

1. A composition mold facing consisting of rubber, sulphur, an accelerator or sulphur carrier, comprising a zinc salt of dimethyldithiorcarbomic acid and a small amount of methyl mustard oil, a filler and lightener, and a drier.

2. A composition mold facing consisting of rubber, sulphur, an accelerator or sulphur carrier, a compound of magnesium, a compound of zinc, lime, and a form of asbestos.

3. A composition mold facing consisting of rubber, sulphur, an accelerator or sulphur carrier, a compound of zinc, lime and a form of asbestos.

4. A composition mold facing consisting of rubber, sulphur, an accelerator or sulphur carrier, a compound of magnesium, lime, and a form of asbestos.

5. A composition mold facing consisting of rubber, sulphur, an accelerator or sulphur carrier, a wax, a compound of magnesium, a compound of zinc, lime, and a form of asbestos.

6. A composition mold facing consisting of rubber, sulphur, an accelerator or sulphur carrier, a wax, lithopone, a compound of magnesium, a compound of zinc, lime and a form of asbestos.

7. A composition mold facing consisting of rubber, sulphur, an accelerator or sulphur carrier, tripoli, a wax, lithophone, a compound of magnesium, a compound of zinc, lime and a form of asbestos.

8. A composition mold facing consisting of rubber, sulphur, an accelerator or sulphur carrier, an oil, or wax, powdered mica, a compound of magnesium, a compound of zinc, lime, and a form of asbestos.

ADRIAN BAISH.